(No Model.) 3 Sheets—Sheet 1.
N. A. CLACHER.
LOZENGE MACHINE.
No. 338,483. Fig. 1. Patented Mar. 23, 1886.
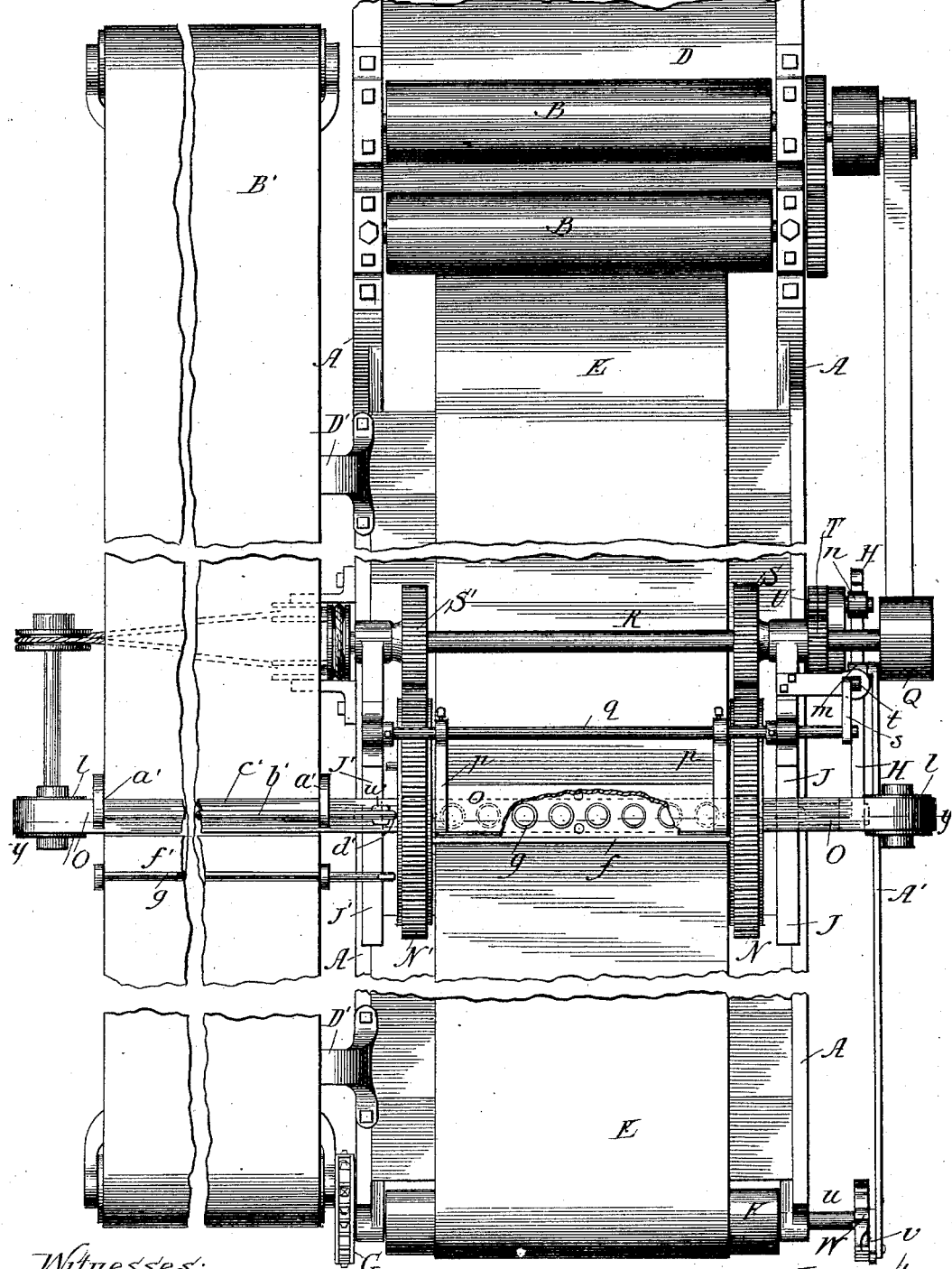
Witnesses:
Frank G. Blanchard
Harry T. Jones
Inventor:
Neil A. Clacher (No Model.) 3 Sheets—Sheet 2.
N. A. CLACHER.
LOZENGE MACHINE.
No. 338,483. Patented Mar. 23, 1886.
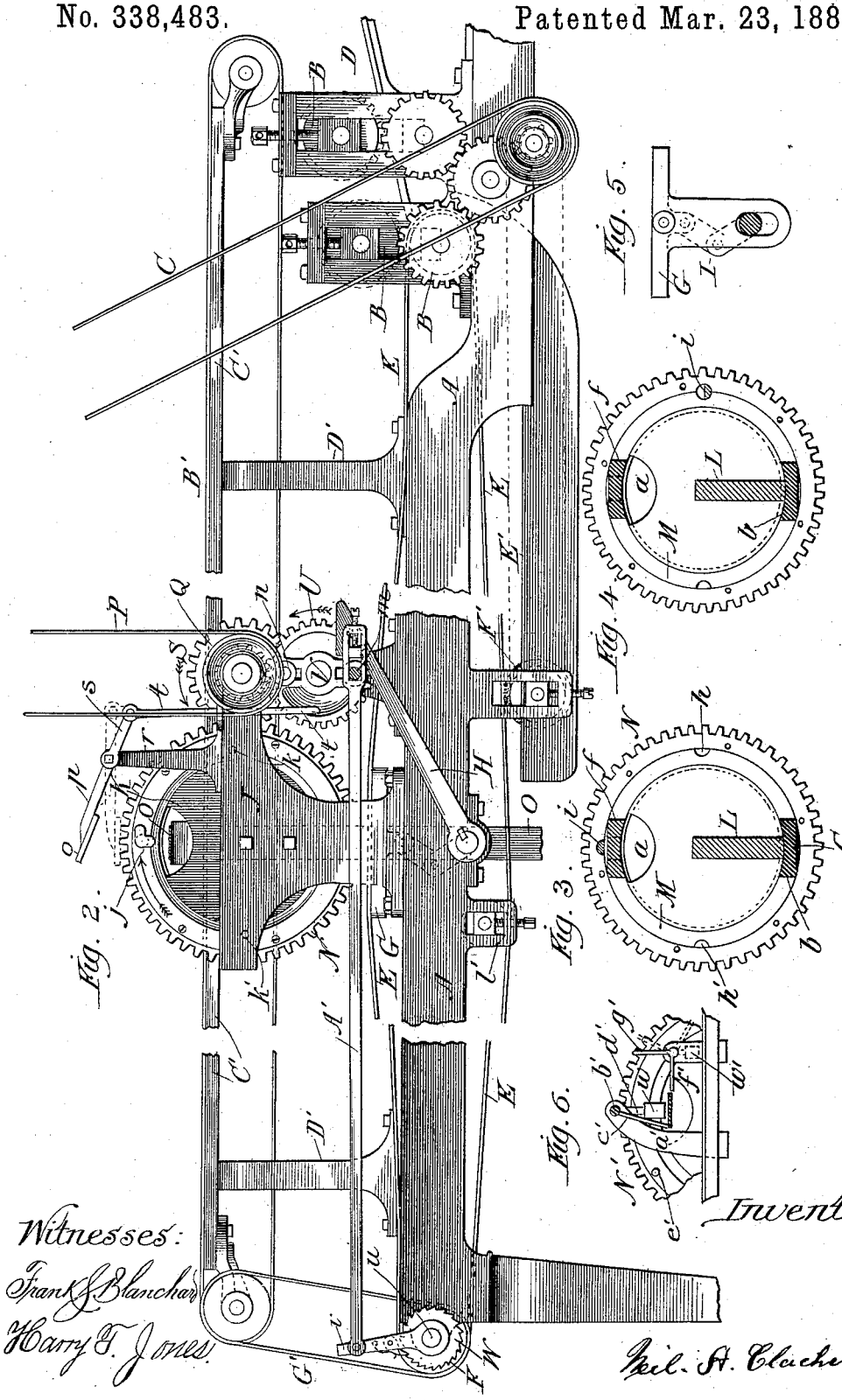
Witnesses:
Frank J. Blanchard
Harry T. Jones
Inventor:
Neil. A. Clacher (No Model.) 3 Sheets—Sheet 3.
N. A. CLACHER.
LOZENGE MACHINE.
No. 338,483. Patented Mar. 23, 1886.
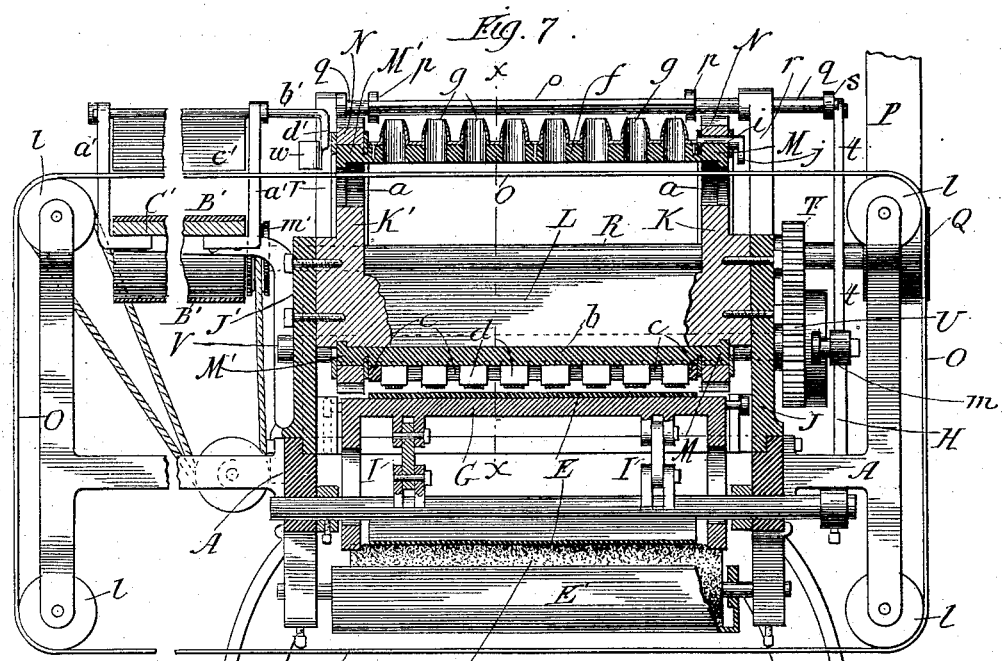

United States Patent Office.

NEIL A. CLACHER, OF CHICAGO, ILLINOIS.

LOZENGE-MACHINE.

SPECIFICATION forming part of Letters Patent No. 338,483, dated March 23, 1886.

Application filed December 28, 1885. Serial No. 186,933. (No model.)

*To all whom it may concern:*

Be it known that I, NEIL A. CLACHER, residing at Chicago, in the county of Cook and State of Illinois, and a citizen of the United States, have invented a new and useful Improvement in Lozenge-Machines, of which the following is a full description, reference being had to the accompanying drawings, in which—

Figure 1 is a plan of the machine. Fig. 2 is a side elevation thereof. Fig. 3 is a vertical section through the web which connects the two disks K K' and through the bars $b$ $f$, the printing and cutting devices not being shown in this figure. This section is taken at line $x$ of Fig. 7. Fig. 4 is the same as Fig. 3, except that some of the parts are in a different position. Fig. 5 is a detail showing the toggle-joint which raises and lowers the table G. Fig. 6 is a detail showing the devices for removing the lozenges after they have been cut, and delivering them upon a delivery-belt, C'. Fig. 7 is a vertical section taken at line $y$ of Fig. 1. Fig. 8 is a detail showing one of the arms which support the table over which the delivery-belt travels. Fig. 9 is an under side view of the chase and the printing devices secured therein. Fig. 10 is an enlarged detail of the clutch-pin.

The leading objects of my invention are to provide improved devices for stamping or printing and cutting lozenges and for delivering them from the machine; also, to provide improved devices for intermittently feeding the dough to printing and cutting devices, which I accomplish as illustrated in the drawings and hereinafter described. Those things which I claim as new will be pointed out in the claims.

In the drawings, A represents the frame of the machine. At one end of the machine are placed four rollers, B, between which the dough is carried and reduced to a sheet of the desired thickness. These rollers may be driven by a belt, C, and by other devices in the usual manner, and the dough is delivered to these rollers from a table, D.

E is a belt, onto which the sheet of dough is delivered as it comes from the rollers B. This belt runs over one of the rollers B at one end and over another roller, F, at the other end, and it passes over a vertically-adjustable table, G, which is raised by means of the lever H and a toggle-joint, I.

J J' are two standards, which are bolted to the main frame, one upon each side thereof.

K K' are two solid disks, except that the top of each is cut away, forming a recess, $a$. These disks K are secured to the standards J, one upon each side.

L is a web, which connects the two disks K. These disks and the web may be cast together.

M M' are two metal rings, which are loose on the disks K K' and can rotate thereon.

$b$ is a bar extending from one ring, M, to the other ring, M'. As represented, this bar is supposed to be cast with the rings M M'.

$c$ is a chase, which is bolted to the under side of the bar $b$.

$d$ are the stamping or printing devices, which are secured in the chase $c$ by the set-screws $e$.

$f$ is another bar, which, as represented, is cast with the rings M M'. This bar $f$ is provided with holes to receive the cutters $g$.

In the ring M are two semicircular recesses, $h$ $h'$.

N N' are two gear-wheels fitting one upon each of the rings M M', and so as to revolve thereon. These gear-wheels are provided upon the outside with flanges which project down partly over the rings M M'. The inside of one of these gear-wheels is provided with a semicircular recess to receive a clutch-pin, $i$. This pin is shown in Fig. 10. It is flattened upon one side, and has, near each end, a shoulder which holds it in place. It also has a projection, $j$, upon one end.

Projecting from the inside of one of the standards J are two pins, $k$ $k'$, so arranged that the projection $j$ upon the pin $i$ will, as the gear-wheel N rotates, come in contact therewith.

O is an endless belt running over pulleys $l$, which belt is arranged transversely to the machine, and passes through the openings $a$ and beneath the cutters $g$, when they are in the position shown in Fig. 7.

P is a belt which runs over a pulley, Q, on the shaft R, on which shaft are two gear-wheels, S S', which engage with the gear-wheels N N'. On this shaft R is a small gear-wheel, T, which engages with the gear-wheel U on the shaft V. This gear-wheel U is provided with two rollers on pins $m$ $n$ upon its outside, adapted to come in contact with a projection on the lever H.

$o$ is a cross-bar secured to the arms $p$, which are secured by set-screws upon the shaft $q$, supported in standards $r$.

$s$ is an arm secured to one end of the shaft $q$, and $t$ is a lever or rod pivoted to the arm $s$ and extending down just outside of the wheel U, its lower end being in such a position that the roller $m$ can engage with it. The other roller, $n$, is placed a little nearer to the shaft upon which the wheel U is placed, so that $n$ will not engage with the end of the arm or lever $t$.

W is a ratchet-wheel on the shaft $u$, which carries the roller F.

$v$ is a lever upon the end of the shaft $u$, which lever carries a pawl to engage with the ratchet-wheel W.

A' is a bar, pivoted at one end to the lever $v$. Its other end is provided with a slot, into which the pin $m$ enters, and in this slot is a block which can be adjusted by a screw.

B' is a belt which travels over rollers supported in arms secured to a table, C', which table is supported by standards D'. The belt B' travels over the table C'. $a'$, Figs. 6 and 7, are arms supported by the table C'.

$b'$ is a rod pivoted in the upper ends of the arms $a'$. This rod carries a sweep, $c'$, which is secured thereto. This rod $b'$ extends nearly to the gear-wheel N', where it is bent downward, as shown by $d'$, and at its lower end is secured a weight, $w$.

On the side of the gear-wheel N' are a series of pins, $e'$, one of which is shown in Fig. 6, which pins are arranged to engage with $d'$.

$f'$ is a shelf hinged in suitable bearings. $g'$ is a strip similar to $f'$, and secured upon the same shaft with $f'$. The pins $e'$ also engage with $g'$. $w'$ (indicated by dotted lines in Fig. 6) is a weight which returns $f'$ $g'$ to their normal position.

I have provided a device for tightening the belt E, which is shown at $l'$, and need not be fully described.

E' is a pan which contains flour. F' is a duster rotating in said pan, and is vertically adjustable, so that it can be made to come in contact with the belt E, which passes over it.

G' is a belt.

Instead of using the two rings M M' and the two bars $b$ $f$, a cylinder might be used, its two ends rotating on the disks K K', and the chase to receive the printing devices can be secured to the cylinder, and the cutters could also be secured to the same.

The transverse belt O is to be driven in any convenient manner. As shown, it is driven from a pulley, $m'$, on the shaft R.

The operation is as follows: The dough which is to be formed into lozenges is to be fed from time to time, in suitable quantity, to the rollers B, by which it will be pressed into a sheet of proper thickness, as usual, which sheet will be delivered upon the belt E. Motion is given to the gear-wheels N N' through the wheels S S'. When the pin $i$ is in the position indicated in Figs. 2 and 3, its flat surface will ride over the outside of the ring M, which will for the time being remain stationary; but when the pin $i$ reaches the pin $k$, projecting inwardly from the standard J, the projecting end $j$ of pin $i$ coming in contact with the pin $k$, the pin $i$ will be partially rotated, and it will assume the position indicated at $i'$, Fig. 4, when it will be partly in the recess $h$ and partly in a recess in N, and then N and M will move together until the pin $i$ reaches the pin $k'$ on the opposite side of J, and then the pin $i$ will be turned into the recess in N and will be released from M, and then M will stand still and the wheel N will continue to travel. While the gear-wheel N makes two revolutions the small gear-wheel U makes one revolution. The pins $m$ and $n$ upon the wheel U are arranged to come in contact with the lever H and force it down, thus, through the toggle-joint, raising the table G. The pin $m$ is also arranged so as at the proper time to push forward the lever A', and through it operate the lever $v$ and the pawl thereon, which engages with the ratchet, giving its shaft a partial revolution, thereby moving the belt and advancing the dough thereon intermittently. This pin $m$ is also arranged, as before stated, so as to engage with the lower end of the lever or arm $t$. While the machine is in motion the transverse belt O is moving, also the longitudinal belt B'. It will be observed that, as the parts are shown and described, the gear-wheels N N' make a half-revolution on the rings M M', such rings standing still, and that during the other half of the revolution of N N' the position of the pin $i$ is such that these rings M M' move with the gear-wheels N N'. The machine being in motion, the stamping or printing devices secured to the bar $b$, which bar is connected with the rings M M', being brought over the table G, will remain stationary for a limited time, and at the same time the lever H will be depressed, and through the toggle the table G will be elevated, forcing the belt E, which travels over it, and the dough upon the top of the belt upward against the printing or stamping devices, and as soon as the stamping or printing has been accomplished the pin $m$ leaves the lever H, and it will assume its former position, and the table G will drop a little. Then the machine continuing to move, the cutting devices $g$ will be brought immediately over the table G, and will there stop for a limited period, during which time one of the pins upon the wheel U will again force down the lever H, which will cause the table to rise, forcing the dough up against the cutters $g$, each of which will cut a lozenge, which will adhere to the inside of the cutter. When the cutters are brought to the position shown in Fig. 7, the rings M M' will remain stationary for a limited time, the pin m will come in contact with the lower end of the lever t, and the bar o will be forced down onto the cutters, and the lozenges therein will be loosened and will drop through the cutters onto the moving belt O, by which the lozenges will be carried to the side of the machine. During this operation the sweep c' will be moved intermittently laterally over the belt O by means of the pins e' upon the side of the gear-wheel N', which pins, one after another, come in contact with d', thus moving the sweep and causing it to pass over the belt O', sweeping the lozenges therefrom onto the shelf f', the sweep being returned to its normal position by the weight w', and the pins e', one after another, come in contact with g', tilting g' and f' into the position indicated by dotted lines in Fig. 6, and the lozenges which are on the shelf f' will fall over onto g', bringing the printed side up, so that the operator can see whether the work is being properly done, and the lozenges will slide from g' onto the belt B', or upon pans upon that belt, and they will be carried to one side and can be removed by an attendant. During the operation the duster F' will be rotating in the pan E', and it will bring flour to the surface of the belt E. The pan E' being long, if there be any undue quantity of flour deposited upon the surface of the belt it will drop off into the pan E'.

The lever t might be operated by a cam, instead of by the pin m.

As shown and described, the rings M M' make but two stops. By a simple mechanical change they can be made to make four stops, and then the lozenges can be embossed by proper devices, and can be printed, if desired, in two colors, the type being inked in the usual manner and the cutters being used as before described.

Heretofore lozenges have been printed and then the dough has been moved forward under cutters, and hence the dough frequently becomes disfigured by the coloring-matter. In my machine the embossing, the printing, and the cutting devices are all carried by a single cylinder, and the embossing, the printing, and the cutting of lozenges from the forward end of a sheet of dough can be accomplished while the sheet remains stationary, and the several parts are so arranged and constructed that these operations will be accurately performed, the registry being perfect.

Another very important feature is the delivery of the lozenges from the cutters upon the transverse belt O, so that the lozenges do not come in contact with each other, and they fall only a very short distance from the cutters before reaching the transverse belt, by which they are delivered to the side of the machine in perfect condition.

The web L, which connects the two stationary disks K K', is so arranged that when the printing or the cutting is being done such web forms a support for the printing and cutting devices.

What I claim as new, and desire to secure by Letters Patent, is—

1. In a lozenge-machine, the combination of a frame, two fixed disks, K K', two rings, M M', two or more bars, b f, connected to said rings to hold the printing and cutting devices, two gear-wheels, N N', and a clutch-pin, i, all substantially as and for the purposes specified.

2. In a lozenge-machine, the combination of a frame, two disks, K K', two rings, M M', two or more bars connected to said rings to receive and hold the printing and cutting devices, two gear-wheels, N N', a clutch-pin, i, a belt E, moving intermittingly, and a vertically-movable table, G, over which the belt E travels, substantially as and for the purposes specified.

3. In a lozenge-machine, the combination of a frame, two disks, K K', two rings, M M', connecting-bars b f, two gear-wheels, N N', belt E, table G, lever H, wheel U, provided with pins m n, rod A', lever v, ratchet-wheel W, and shaft u, substantially as and for the purposes specified.

4. In a lozenge-machine, the combination of a frame, two disks, K K', rings M M', bars b f, for receiving the printing and cutting devices, gear-wheels N N', clutch-pin i, belt E, belt O, and bar o, intermittently operating, substantially as and for the purposes specified.

5. In a lozenge-machine, the combination of a frame, two disks, K K', two rings, M M', connecting-bars b f, to receive the printing and cutting devices, gear-wheels N N', belt O, arranged to receive the lozenges from the cutters, delivery-belt B', and a sweep to remove the lozenges from the belt O to the belt B', substantially as and for the purposes specified.

6. In a lozenge-machine, the combination of a frame, disks K K', rings M M', bars b f, carrying the printing and cutting devices, wheels S S', wheel U, provided with pins m n, belt E, table G, lever H, toggle-joint I, rod or lever A', lever v, ratchet-wheel W, and roller F, substantially as and for the purposes specified.

7. In a lozenge-machine, cutting devices revolving intermittently, in combination with a carrying-belt, O, moving transversely to the machine, and arranged to receive the lozenges from the cutters and carry them to one side, substantially as specified.

8. In a lozenge-machine, a belt, E, arranged to be moved intermittently, in combination with a vertically-movable table, G, devices for intermittently moving said table upward, and devices for printing and cutting the lozenges, substantially as specified.

9. In a lozenge-machine, a belt, E, in combination with a pan, E', and a duster, F', substantially as and for the purpose specified.

10. In a lozenge-machine, a belt, E, arranged to be moved intermittently, in combination with an intermittently vertically-moving table, and printing and cutting devices intermittently rotating over said table, substantially as and for the purposes specified.

11. In a lozenge-machine, two stationary disks, K K', each cut away upon one side, as shown at $a$, in combination with a transverse belt, O, and intermittently-rotating printing and cutting devices carried by bars $b$ $f$, secured to rings M M', or by a rotating cylinder, substantially as and for the purposes specified.

NEIL A. CLACHER.

Witnesses:
E. A. WEST,
HARRY T. JONES.